(12) United States Patent
Patel et al.

(10) Patent No.: US 11,440,663 B2
(45) Date of Patent: Sep. 13, 2022

(54) INFLATABLE POD SYSTEMS ON A AIRCRAFT AND METHODS FOR INFLATING THE INFLATABLE POD SYSTEMS

(71) Applicant: The Boeing Company, Chicago, IL (US)

(72) Inventors: Amar Patel, Chicago, IL (US); Abhishek Rawat, Chicago, IL (US); Yashlay Sinha, Chicago, IL (US)

(73) Assignee: The Boeing Company, Chicago, IL (US)

( * ) Notice: Subject to any disclaimer, the term of this patent is extended or adjusted under 35 U.S.C. 154(b) by 893 days.

(21) Appl. No.: 16/260,287

(22) Filed: Jan. 29, 2019

(65) Prior Publication Data

US 2020/0239143 A1 Jul. 30, 2020

(51) Int. Cl.
*B64D 11/00* (2006.01)
*B64D 11/06* (2006.01)
*B64D 13/06* (2006.01)

(52) U.S. Cl.
CPC .......... *B64D 11/0621* (2014.12); *B64D 13/06* (2013.01); *B64D 2013/0618* (2013.01); *B64D 2201/00* (2013.01)

(58) Field of Classification Search
CPC .......... B64D 11/0621; B64D 11/06205; B64D 13/06; B64D 2013/0618; B64D 2201/00
See application file for complete search history.

(56) References Cited

U.S. PATENT DOCUMENTS

| 3,603,535 A * | 9/1971 | DePolo | B60R 21/26 244/121 |
| 2007/0113486 A1 * | 5/2007 | Howland | A62C 3/0257 89/36.01 |
| 2013/0088056 A1 * | 4/2013 | Quatanens | B60R 21/231 297/216.13 |
| 2015/0321744 A1 * | 11/2015 | Vetter | B64C 1/10 244/118.5 |
| 2016/0001735 A1 | 1/2016 | Quatanens et al. | |
| 2017/0225788 A1 * | 8/2017 | Humbert | B60R 21/233 |
| 2018/0370610 A1 * | 12/2018 | Sankrithi | B64D 11/06 |

* cited by examiner

*Primary Examiner* — Phutthiwat Wongwian
*Assistant Examiner* — Sherman D Manley
(74) *Attorney, Agent, or Firm* — McDonnell Boehnen Hulbert & Berghoff LLP

(57) ABSTRACT

An inflatable pod system on an aircraft includes an inflatable pod including a nozzle to receive air for inflation of the inflatable pod, and a hose assembly including a first end having an adaptor fitting that is configured to press fit with an air duct nozzle of an air duct of the aircraft and a second end having an adaptor configured to couple to the nozzle. In an example, the hose assembly delivers bleed air from the air duct, as provided by an environmental control system (ECS) of the aircraft, to the inflatable pod to inflate the inflatable pod. In another example, an air duct assembly line couples the ECS with the inflatable pod, and a control system triggers inflation via the air duct assembly line based on receipt of an electronic inflation signal.

20 Claims, 8 Drawing Sheets

INFLATABLE POD SYSTEMS ON A AIRCRAFT AND METHODS FOR INFLATING THE INFLATABLE POD SYSTEMS

FIELD

The present disclosure relates to inflatable pods that can be used for comfort or safety mechanisms, and more particularly, to inflatable pods on an aircraft that can be inflated using bleed air from an aircraft system or manually as well.

BACKGROUND

Comfort and safety are high priority in passenger transportation vehicles. During trips that have long durations, this can be more of an issue. In airplane travel, for example, different areas of an airplane offer different classes for travel with each class having a different amount of space provided. As an example, business class seating typically provides more space for passengers, while economy class seating has limited seat push-back capabilities and passengers generally sit more upright for the duration of flight.

Further, in an airplane, it can be difficult to sleep due to lack of a comfortable position to rest your head. Some passengers may rest their head on the tray table or sleep on a shoulder of a person sitting next to them. However, the lack of space makes it difficult to be comfortable.

Existing solutions for increasing comfortability on an airplane include the passenger bringing a head rest as a carry-on, or limited seat push-back capability of the seats. Head rests may not provide much comfort while sitting in an upright posture, and seat push-back capability is minimal for economy class seating.

What is needed is a way to enhance passenger experiences by providing a more comfortable area for rest, as well as increased safety features.

SUMMARY

In an example, an inflatable pod system on an aircraft is described. The inflatable pod system comprises an inflatable pod including a nozzle to receive air for inflation of the inflatable pod, and a hose assembly including a first end having an adaptor fitting that is configured to press fit with an air duct nozzle of an air duct of the aircraft and a second end having an adaptor configured to couple to the nozzle of the inflatable pod. When the hose assembly is coupled between the air duct nozzle of the air duct of the aircraft and the nozzle of the inflatable pod, the hose assembly delivers bleed air from the air duct of the aircraft, as provided by an environmental control system (ECS) of the aircraft, to the inflatable pod to inflate the inflatable pod.

In another example, an inflatable pod system on an aircraft is described. The inflatable pod system comprises an inflatable pod positioned substantially beneath a seat in the aircraft when deflated, and an air duct assembly line coupling an environmental control system (ECS) of the aircraft with the inflatable pod. The air duct assembly line couples to the inflatable pod at a location beneath the seat. The inflatable pod system also comprises a control system configured to trigger inflation of the inflatable pod via the air duct assembly line based on receipt of an electronic inflation signal, and when inflation is triggered the air duct assembly line delivers bleed air from the ECS of the aircraft to the inflatable pod to inflate the inflatable pod.

In another example, a method for inflating an inflatable pod system on an aircraft is described. The method comprises coupling an environmental control system (ECS) of the aircraft with an inflatable pod via an air duct assembly line, and the air duct assembly line couples to the inflatable pod at a location beneath a seat in the aircraft. The method also comprises triggering, by a control system, inflation of the inflatable pod via the air duct assembly line based on receipt of an electronic inflation signal, and delivering bleed air from the ECS of the aircraft to the inflatable pod to inflate the inflatable pod.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings which are not necessarily drawn to scale, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples described herein, inflatable pods are provided for use in aircraft as comfort or safety options for passengers. In one instance, the inflatable pod is a component of an inflatable airbag system that is a safety feature. In another instance, the inflatable pod can be used as a comfort option for a passenger, and may be inflated using bleed air from a duct of the aircraft or manually with a straw pipe.

In one example, the inflatable pod is stowed beneath a seat of the aircraft. In instances in which the inflatable pod is coupled to the air supply system, inflation of the inflatable pod can be activated by sending an electronic inflation signal (e.g., via pushing a button by the passenger) or manually with a straw pipe or use of a hose assembly. Thus, whenever a passenger feels tired or would like to rest, activation of a spring loaded push button can automatically inflate the inflatable pod above a tray table in front of the passenger that can be used for sleep during flight. Pushing the same button again can caused deflation of the inflatable pod, and the deflated inflatable pod can be repositioned to its original state beneath the seat or in a storage area of a seatback in front of the passenger. The inflatable pod can thus be installed beneath the seat and can be repositioned with a minimum turnaround time such that the aircraft can be made ready for a next flight within stipulated time durations.

In other examples, the inflatable pod can be used as an inflight airbag in case of any emergency situations where this can be held while leaning down or bracing positions and will absorb shocks of sudden impact to passengers.

Figure 1:
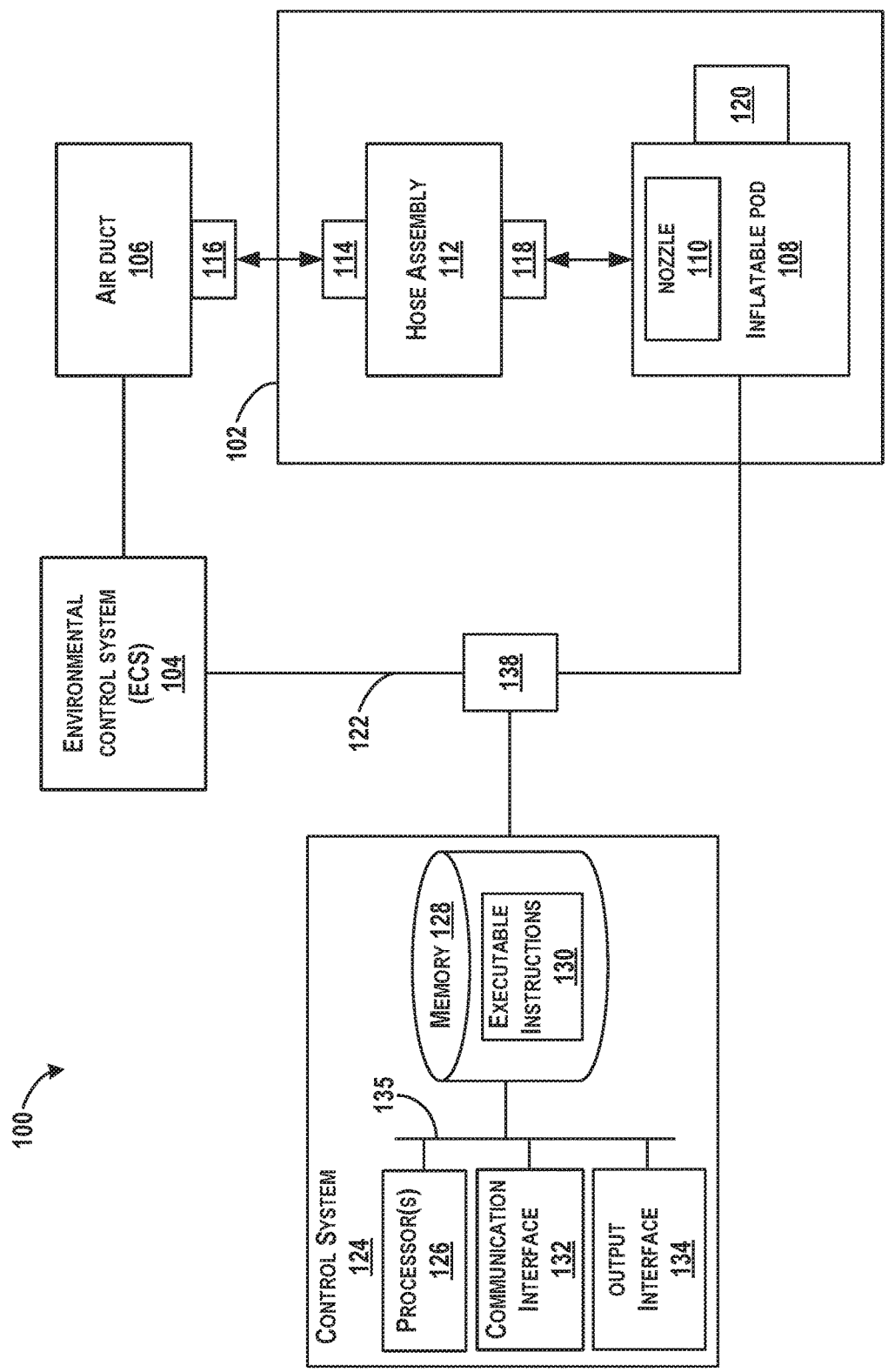
FIG. 1 illustrates an example of an aircraft, according to an example implementation.

Referring now to the figures, FIG. 1 illustrates an aircraft 100, according to an example implementation. The aircraft 100 includes an inflatable pod system 102 on the aircraft 100, an ECS 104 (environmental control system), and an air duct 106 coupled to the ECS 104.

The inflatable pod system 102 includes an inflatable pod 108 including a nozzle 110 to receive air for inflation of the inflatable pod 108, a hose assembly 112 including a first end having an adaptor fitting 114 that is configured to press fit with an air duct nozzle 116 of the air duct 106 of the aircraft 100 and a second end having an adaptor 118 configured to couple to the nozzle 110 of the inflatable pod 108. When the hose assembly 112 is coupled between the air duct nozzle 116 of the air duct 106 of the aircraft 100 and the nozzle 110 of the inflatable pod 108, the hose assembly 112 delivers bleed air from the air duct 106 of the aircraft 100, as provided by the ECS 104 of the aircraft 100, to the inflatable pod 108 to inflate the inflatable pod 108.

In one example, the inflatable pod 108 further includes a release valve 120 to release air and deflate the inflatable pod 108. The release valve 120 may be manually operated to release air.

The inflatable pod system 102 may include the inflatable pod 108 positioned substantially beneath a seat in the aircraft 100 when deflated (as described below and shown in FIG. 2). In other examples, the inflatable pod system 102 further includes an air duct assembly line 122 coupling the ECS 104 of the aircraft 100 with the inflatable pod 108, and the air duct assembly line 122 couples to the inflatable pod 108 at a location beneath the seat. In such examples, the inflatable pod system 102 includes a control system 124 configured to trigger inflation of the inflatable pod 108 via the air duct assembly line 122 based on receipt of an electronic inflation signal, and when inflation is triggered the air duct assembly line 122 delivers bleed air from the ECS 104 of the aircraft 100 to the inflatable pod 108 to inflate the inflatable pod 108.

The control system 124 may take the form of a computing device, for example, and includes processor(s) 126 (which may be one or more processors), a memory 128 (e.g., a non-transitory computer readable storage medium) having stored therein instructions 130 (e.g., executable instructions), that when executed by the processor(s) 126, causes the processor(s) 126 to perform functions for inflating or deflating the inflatable pod 108. The control system 124 is also shown to include a communication interface 132 and an output interface 134, and all components of the control system 124 are each connected to a communication bus 135. The control system 124 may also include hardware to enable communication within the control system 124 and between the control system 124 and other devices (not shown). The hardware may include transmitters, receivers, and antennas, for example.

The communication interface 132 may be a wireless interface and/or one or more wireline interfaces. The communication interface 132 allows for both short-range communication and long-range communication to one or more networks or to one or more remote devices.

The memory 128 may include or take the form of one or more computer-readable memory or computer readable storage media that can be read or accessed by the processor(s) 126. The computer-readable storage media can include volatile and/or non-volatile storage components, such as optical, magnetic, organic or other memory or disc storage, which can be integrated in whole or in part with the processor(s) 126. The memory 128 is considered non-transitory computer readable memory or non-transitory computer readable media. In some examples, the memory 128 can be implemented using a single physical device (e.g., one optical, magnetic, organic or other memory or disc storage unit), while in other examples, the memory 128 can be implemented using two or more physical devices.

The memory 128 thus is a non-transitory computer readable memory, and the instructions 130 are stored thereon. The instructions 130 include computer executable code. When the instructions 130 are executed by the processor(s) 126, the processor(s) 126 are caused to perform functions of the control system 124.

The processor(s) 126 may be a general-purpose processor or a special purpose processor (e.g., digital signal processors, application specific integrated circuits, etc.). The processor(s) 126 may receive inputs from the communication interface 132, and process the inputs to generate outputs that are stored in the memory 128 and output via the output interface 134. Thus, the output interface 134 may be similar to the communication interface 132 and can be a wireless interface (e.g., transmitter) or a wired interface as well.

As mentioned, the memory 128 has stored therein instructions 130, that when executed by the processor(s) 126, causes the processor(s) 126 to perform functions for inflating or deflating the inflatable pod 108. The control system 124 can be coupled to the air duct assembly line 122 via an electronically operated valve 138, such that the control system 124 can cause bleed air from the ECS 104 to be delivered to the inflatable pod 108 for inflation.

In some examples, to achieve these operations, functions include the control system 124 triggering inflation of the inflatable pod 108 during landing of the aircraft 100. For instance, in situations of high turbulence, a pilot can trigger inflation using the control system 124 to cause deployment and inflation of the inflatable pod 108 for safety. Generally, the control system 124 is configured to trigger inflation of the inflatable pod 108 via the air duct assembly line 122 based on receipt of an electronic inflation signal, which can be received via activation of a button by a passenger or a pilot, or received from a safety system (not shown) of the aircraft 100 as well.

Figure 2:
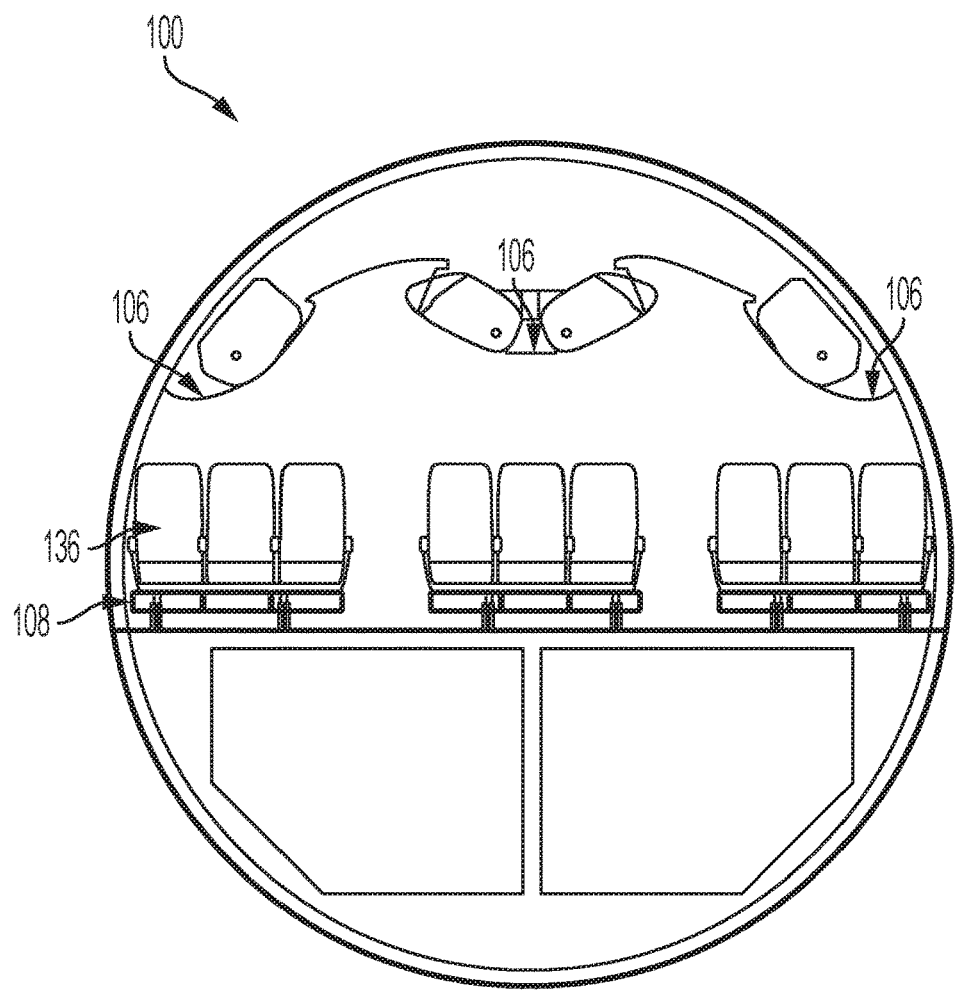
FIG. 2 illustrates a cross-section view of the aircraft, according to an example implementation.

FIG. 2 illustrates a cross-section view of the aircraft 100, according to an example implementation. In FIG. 2, the air duct 106 of the aircraft 100 is an overhead air duct positioned above a seat 136 in the aircraft 100. Air ducts may be included over seating areas of the aircraft 100, or individual air ducts may be provided overhead of each individual seat, for example. In FIG. 2, the inflatable pod 108 is positioned substantially beneath the seat 136 in the aircraft 100 when deflated. A storage bin or storage area can be available beneath the seat 136 and positioned to be accessible by a passenger of the seat 136.

Figure 3:
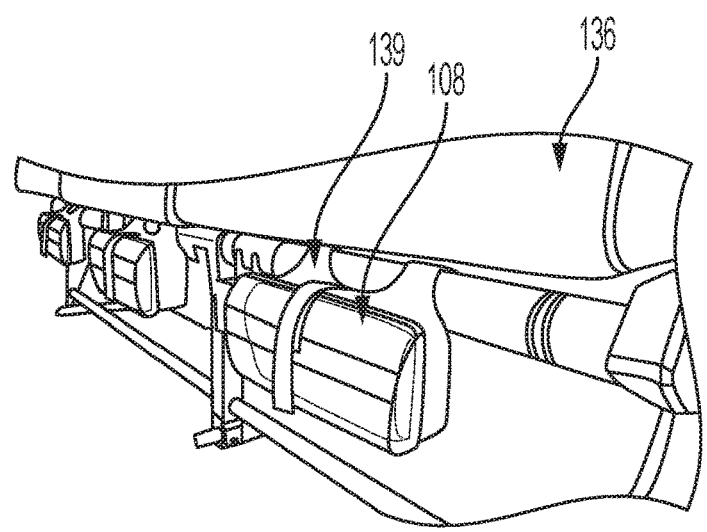
FIG. 3 illustrates positioning of the inflatable pod beneath the seat, according to an example implementation.

FIG. 3 illustrates positioning of the inflatable pod 108 beneath the seat 136, according to an example implementation. In FIG. 3, a storage bin 139 is included and mounted beneath the seat 136 to hold the inflatable pod 108 when deflated.

Figure 4:
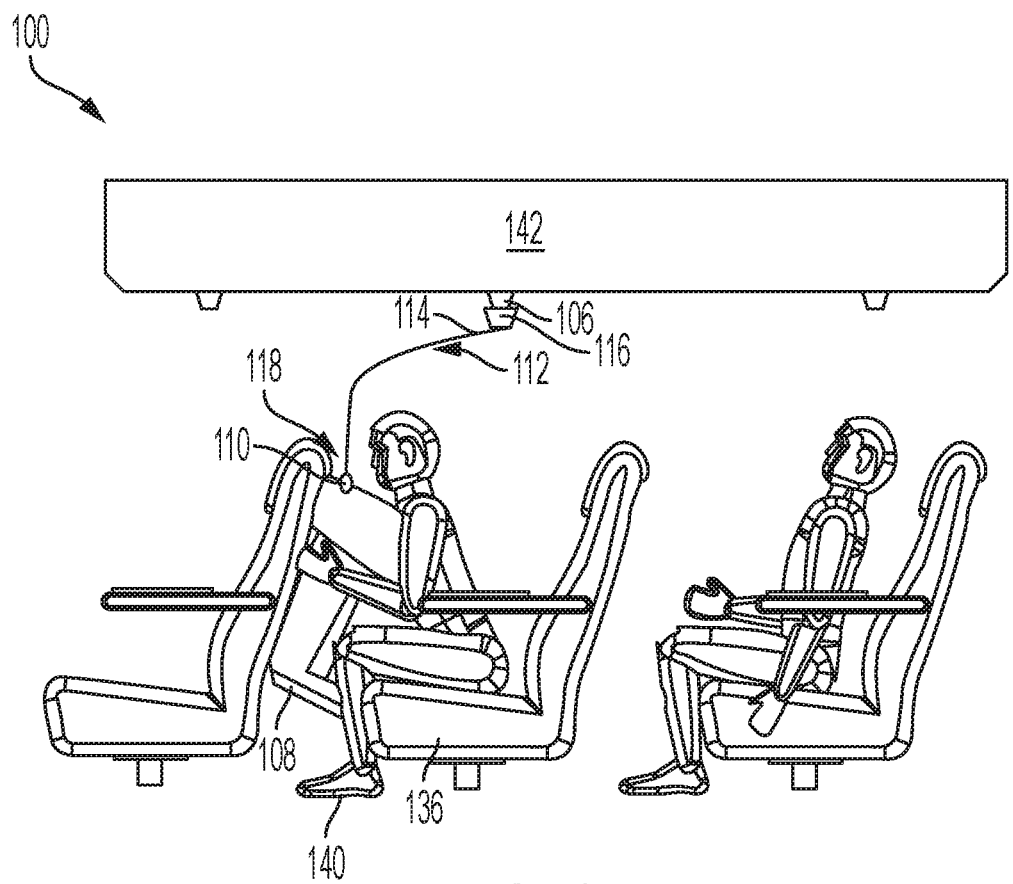
FIG. 4 illustrates a side view of seating in the aircraft including an example of the inflatable pod system installed in the aircraft, according to an example implementation.

FIG. 4 illustrates a side view of seating in the aircraft 100 including an example of the inflatable pod system 102 installed in the aircraft 100, according to an example implementation. The inflatable pod 108 is initially positioned beneath the seat 136 when deflated. In one example, a passenger 140 may manually remove the inflatable pod 108 from beneath the seat 136, and connect the hose assembly 112 so that the first end having the adaptor fitting 114 is press fit with the air duct nozzle 116 of the air duct 106 in an overhead area 142 of the aircraft 100 and the second end having the adaptor 118 is connected to the nozzle 110 of the inflatable pod 108. The adaptor fitting 114 and the adaptor 118 may each include rubber seals for connections. Then, the passenger 140 can control the air duct 106 to allow air to flow through the hose assembly to deliver bleed air from the air duct 106 of the aircraft 100 to the inflatable pod 108 to inflate the inflatable pod 108. FIG. 4 illustrates the inflatable pod 108 in an inflated configuration. For example, when inflated, the inflatable pod 108 occupies space in front of a torso of the passenger 140.

In some examples, the hose assembly 112 can also be used for oral or manual inflation of the inflatable pod 108 as well.

Thus, the inflatable pod system 102 can be operated to inflate the inflatable pod 108 via use of bleed air from aircraft engines passed to the ECS 104 and further pumped into a cabin area of the aircraft by the air duct 106, or via manual inflation as well. The inflatable pod 108, when used for comfort, acts as a soft pillow, and thus does not require pressurized air inflation. When used for safety, the inflatable pod 108 may be inflated more fully, however.

Figures 5, 6, 7:
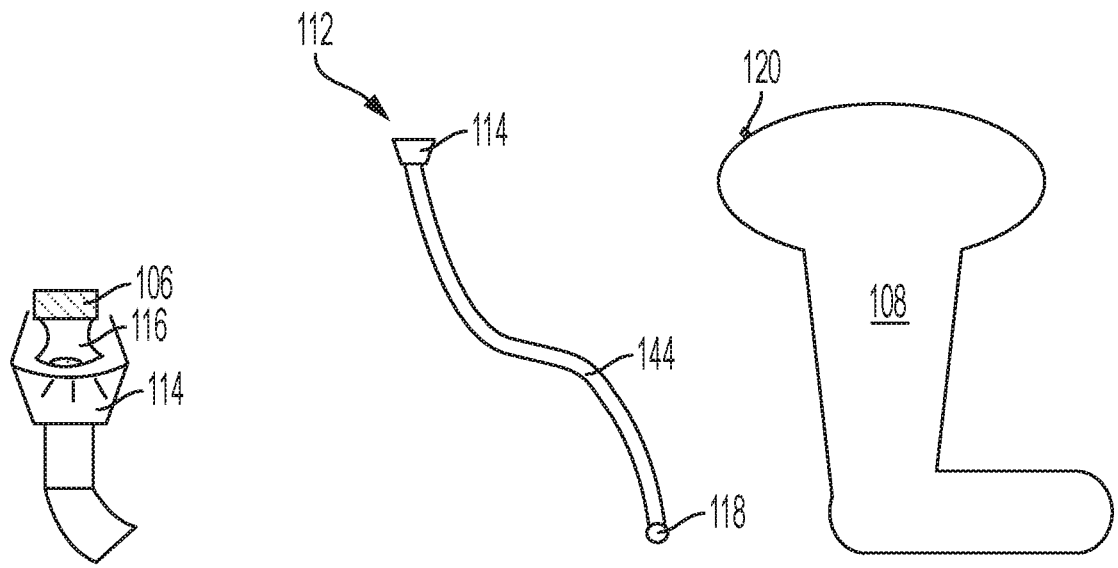
FIG. 5 illustrates a side view of a connection of the hose assembly with the air duct, according to an example implementation.
FIG. 6 illustrates a side view of the hose assembly, according to an example implementation.
FIG. 7 illustrates a side view of the inflatable pod when inflated, according to an example implementation.

FIG. 5 illustrates a side view of a connection of the hose assembly 112 with the air duct 106, according to an example implementation. The hose assembly 112 includes the adaptor fitting 114 that press fits over the air duct nozzle 116 of the air duct 106. The adaptor fitting 114 can include a rubber seal to slide over the air duct nozzle 116, for example.

FIG. 6 illustrates a side view of the hose assembly 112, according to an example implementation. The hose assembly 112 may include a hose 144 between the adaptor fitting 114 and the adaptor 118, and the hose 144 may be about 3-5 feet long, for example. The hose 144 is a light weight flexible tube, and the adaptor fitting 114 and the adaptor 118 may be plastic adaptors with seals to prevent leaking of air during inflation.

FIG. 7 illustrates a side view of the inflatable pod 108 when inflated, according to an example implementation. FIG. 7 illustrates the release valve 120, which may be positioned elsewhere on the inflatable pod 108, to function as a self-release valve for deflating the inflatable pod 108. The release valve 120 can be manually opened to release air out of the inflatable pod 108 to deflate the inflatable pod 108 instantaneously. Subsequently, the inflatable pod 108 can be folded in a deflated condition and pushed inside an available pouch or netted space under the seat 136.

Figure 8:
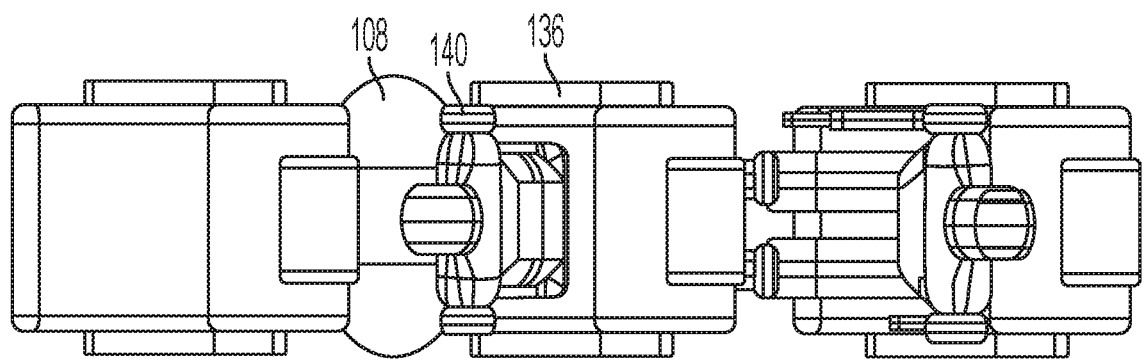
FIG. 8 illustrates a top view of the inflatable pod when inflated in the aircraft, according to an example implementation.
Figure 9:
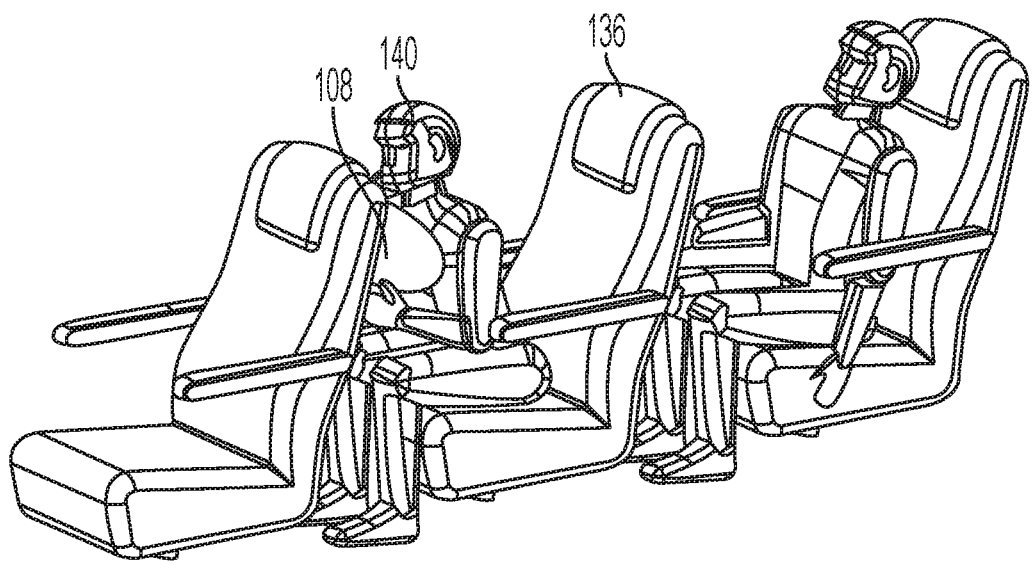
FIG. 9 illustrates an isomeric view of the inflatable pod when inflated in the aircraft, according to an example implementation.

FIG. 8 illustrates a top view of the inflatable pod 108 when inflated in the aircraft 100, according to an example implementation. FIG. 9 illustrates an isometric view of the inflatable pod 108 when inflated in the aircraft 100, according to an example implementation. As shown, the inflatable pod 108 when inflated occupies space in front of a torso of the passenger 140 and may rise up to a level of the head of the passenger 140, for example.

Figure 10:
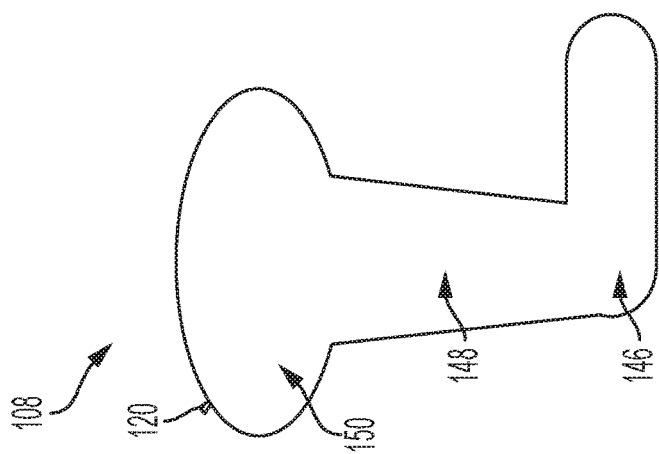
FIG. 10 illustrates a side view of an example of the inflatable pod when inflated, according to an example implementation.

FIG. 10 illustrates a side view of an example of the inflatable pod 108 when inflated, according to an example implementation. The inflatable pod 108 may include a foldable piece of coated cloth or polymer without any internal structure. A material of the inflatable pod 108 may thus be flexible and may include a bag that is designed to inflate rapidly. In the example shown in FIG. 10, the inflatable pod 108 is in a form of an L-shaped pod, in which the inflatable pod 108 includes a first portion 146 that is substantially horizontal that is coupled to a second portion 148 that is an upright cylinder that is coupled to a third portion 150 that includes a pillow top. Referring back to FIG. 4, when installed in the seat 136 of the aircraft, the first portion 146 can be coupled to the air duct assembly line 122, the second portion 148 is then coupled to the first portion 146, and the second portion 148 includes an upright cylindrical portion that is positioned in front of the seat 136 in the aircraft 100 when inflated, and the third portion 150 coupled to the second portion 148 includes a circular top. The inflatable pod 108 is described as including three portions, however, the inflatable pod 108 is an integral component.

Figure 11:
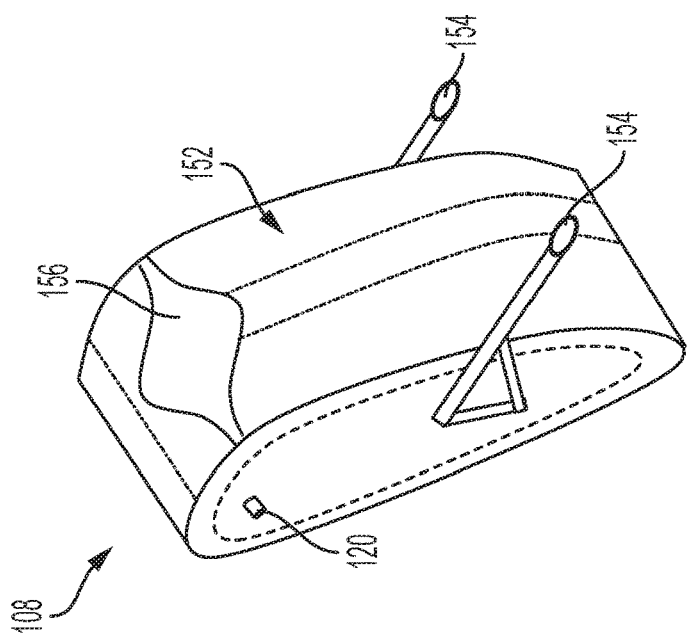
FIG. 11 illustrates a side view of another example of the inflatable pod when inflated, according to an example implementation.

FIG. 11 illustrates a side view of another example of the inflatable pod 108 when inflated, according to an example implementation. In FIG. 11, the inflatable pod 108 includes a stitch supported airbag or air pillow configuration with a stitched front support 152 that when inflated takes a predefined shape. The inflatable pod 108 further includes one or more straps 154 to couple the inflatable pod 108 to an arm rest of the seat 136 of the aircraft 100. The inflatable pod 108 also includes a support area 156, for example, for a face/head of the passenger 140 that may be foam or include padding.

Figure 12:
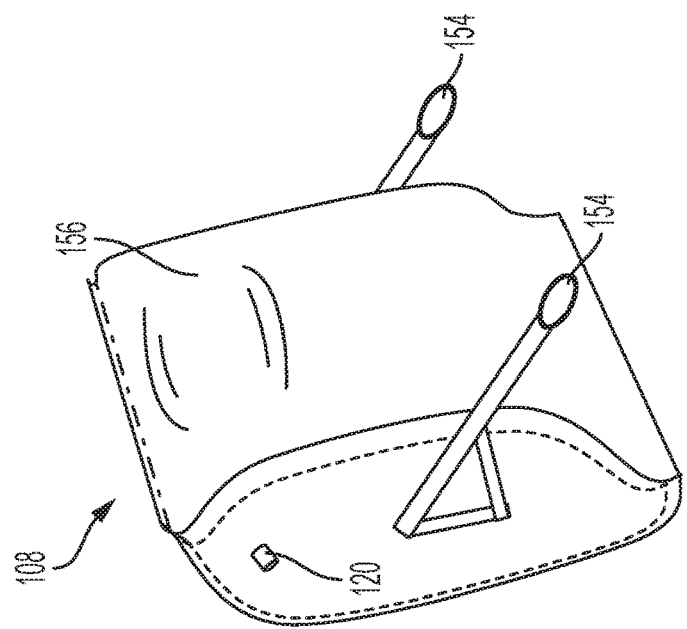
FIG. 12 illustrates a side view of another example of the inflatable pod when inflated, according to an example implementation.

FIG. 12 illustrates a side view of another example of the inflatable pod 108 when inflated, according to an example implementation. In FIG. 12, the inflatable pod 108 includes an unstitched supported airbag or pillow configuration that can acquire any general shaped based on an amount of inflation and air pressure. The inflatable pod 108 has the support area 156, which may not include any foam padding.

In each of FIGS. 10-12, the release valve 120 is shown, and the release valve may further be used for manual inflation to blow air into the inflatable pod 108. Furthermore, any examples of the inflatable pod 108 can further includes a cover on the pillow portion for hygiene purposes that may be disposable, for example.

Figure 13:
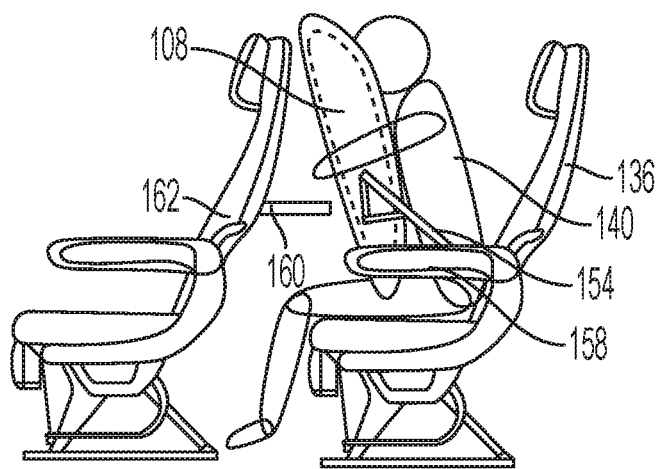
FIG. 13 illustrates a side view of the inflatable pod when inflated in the aircraft, according to an example implementation.

FIG. 13 illustrates a side view of the inflatable pod 108 when inflated in the aircraft 100, according to an example implementation. The inflatable pod 108 is shown to fit between the passenger 140 and a tray table 160 positioned on a backside of a seat 162 when the tray table 160 is in an open (un-stowed) position. The passenger 140 can inflate the inflatable pod 108 and position the inflatable pod 108 on the tray table 160 and use the inflatable pod 108 as a pillow. As shown, the one or more straps 154 can be manually attached to an arm rest 158 of the seat 136. The one or more straps 154 can include a fixed hook type arrangement that is retractable when required, and the passenger can then lie over the inflatable pod 108 resting body weight to gain a comfortable support for sleep.

Figure 14:
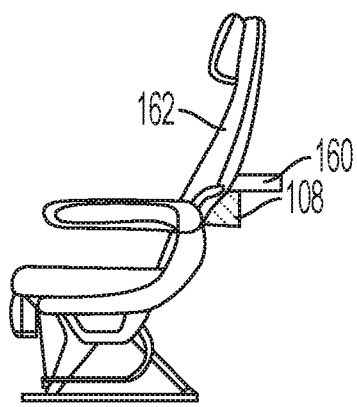
FIG. 14 illustrates a side view of the inflatable pod located under the tray table when not inflated in the aircraft, according to an example implementation.
Figure 15:
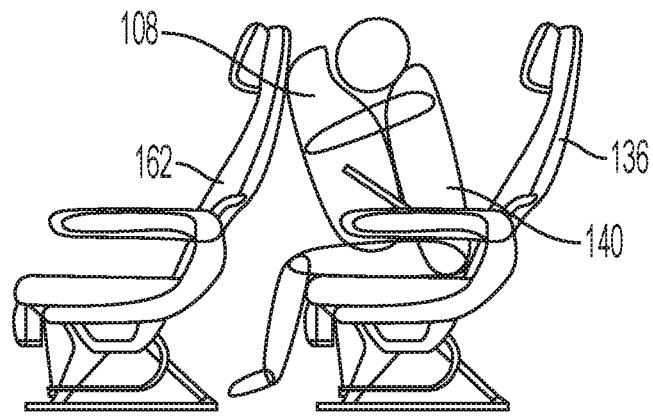
FIG. 15 illustrates a side view of the inflatable pod when inflated in the aircraft, according to an example implementation.

FIG. 14 illustrates a side view of the inflatable pod 108 located under the tray table 160 when not inflated in the aircraft 100, according to an example implementation. The tray table 160 is in a closed position when upright and in an open position when lowered to a horizontal position, and the inflatable pod 108 can be positioned on the backside of the seat 162, and when inflated, the inflatable pod 108 causes the tray table 160 to be in the closed position. FIG. 15 illustrates a side view of the inflatable pod 108 when inflated in the aircraft 100, according to an example implementation. In FIG. 15, the inflatable pod 108 may be inflated to an amount such that the inflatable pod 108 occupies more space between the passenger 140 and the seat 162 and the tray table 160 is forced into the closed position.

Figure 16:
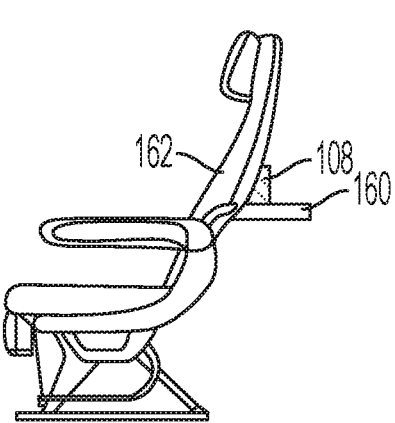
FIG. 16 illustrates a side view of the inflatable pod located behind the tray table when not inflated in the aircraft, according to an example implementation.
Figure 17:
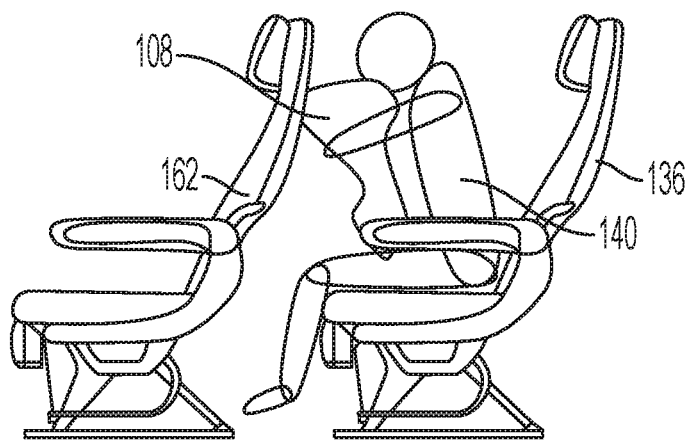
FIG. 17 illustrates a side view of the inflatable pod when inflated in the aircraft, according to an example implementation.

FIG. 16 illustrates a side view of the inflatable pod 108 located behind the tray table 160 when not inflated in the aircraft 100, according to an example implementation. The tray table 160 is in a closed position when upright and in an open position when lowered to a horizontal position, and the inflatable pod 108 can be positioned on the backside of the seat 162, and when inflated, the inflatable pod 108 causes the tray table 160 to be in the open position. FIG. 17 illustrates a side view of the inflatable pod 108 when inflated in the aircraft 100, according to an example implementation.

In other examples, the inflatable pod 108 can be positioned at other areas in the aircraft 100. For example, the inflatable pod 108 can be positioned on a side wall of the aircraft 100, on the seat 162 in front of the passenger 140, beneath the seat 136 of the passenger 140, or in an area on a floor underneath the passenger 140, for example.

The example configurations shown in FIGS. 13-17 illustrate the inflatable pod 108 unconnected to the air duct assembly line 122, and thus, the inflatable pod 108 is inflated either manually or via use of the hose assembly 112 connected to the air duct 106 overhead the passenger 140. Such configurations enable use of the inflatable pod 108 within existing aircraft with no changes. A small retrofit with minimal modifications is required to install the inflatable pod 108 for each seat in the aircraft 100.

Figure 18:
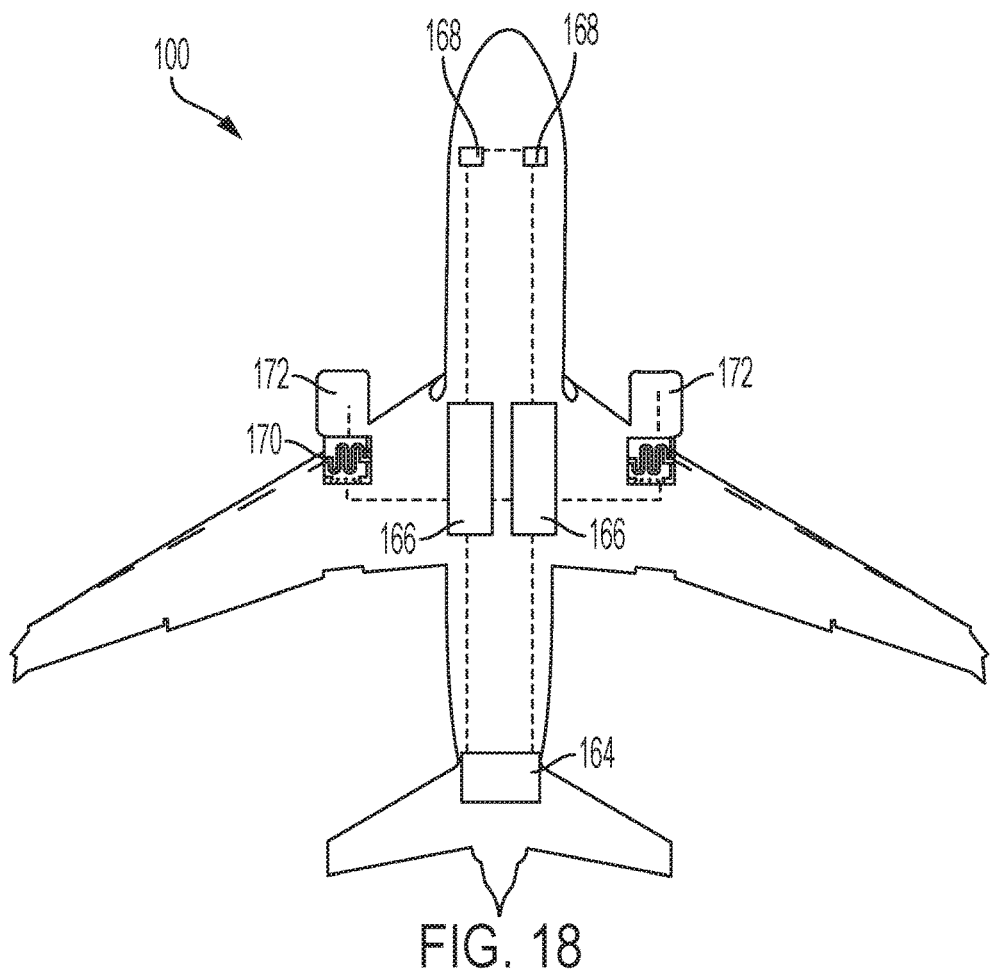
FIG. 18 illustrates an example of a bleed line system of the aircraft, according to an example implementation.

In examples in which the inflatable pod 108 is inflated using the ECS 104. FIG. 18 illustrates a bleed line system of the aircraft 100, according to an example implementation. In FIG. 18, the aircraft 100 includes an auxiliary power unit (APU) 164 coupled to air condition packs 166 and air condition pack controllers 168. The aircraft 100 also includes heat exchangers 170 coupled to the air condition packs 166 to enable bleed air 172 to be sucked in through a fourth stage of a compressor of an engine, and passed via the heat exchangers 170 to the ECS 104.

Figure 19:
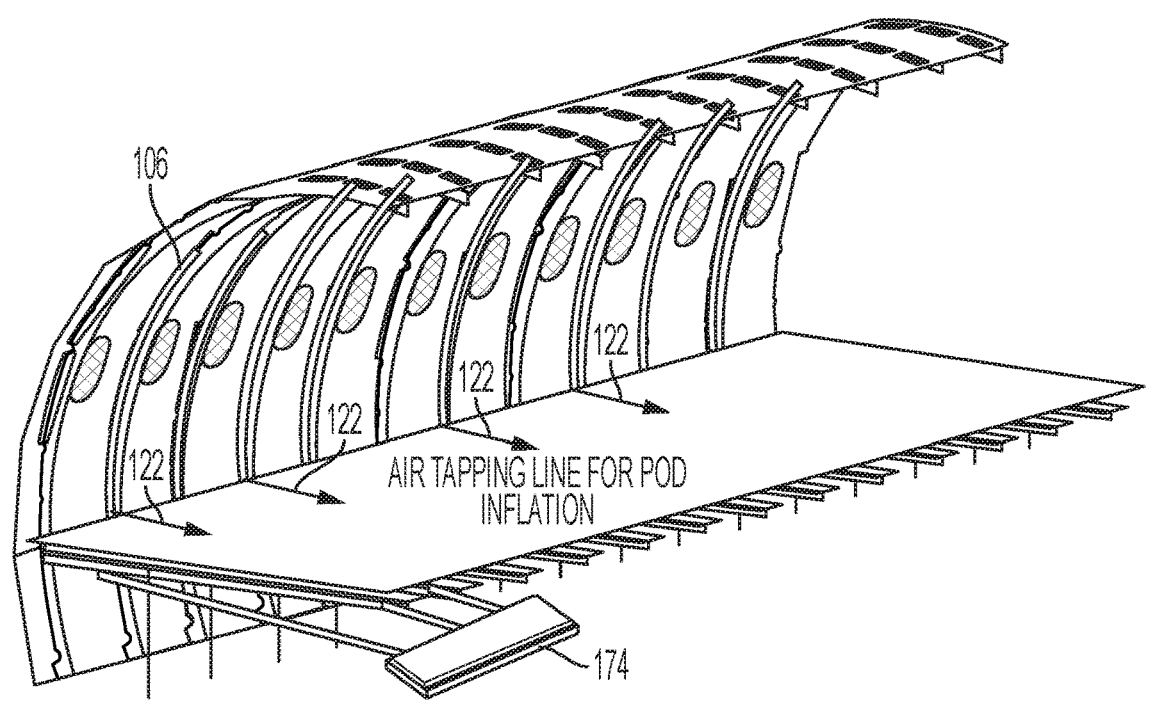
FIG. 19 illustrates a cross section view of the aircraft and bleed line system, according to an example implementation.

FIG. 19 illustrates a cross section view of the aircraft 100 and bleed line system, according to an example implementation. In some examples, when the inflatable pod 108 is positioned substantially beneath the seat 136 in the aircraft 100 when deflated, and the air duct assembly line 122 couples to the inflatable pod 108 at a location beneath the seat 136. Thus, the inflatable pod 108 is connected to the ECS 104 through the air duct assembly line 122. FIG. 19 illustrates the air duct assembly line 122 extending along a floor of the aircraft 100 to seating areas. A distribution manifold 174 is included and coupled to the air duct assembly line 122 to distribute air from the ECS 104. The air duct 106 is further shown and rises above the seating areas.

Thus, within examples, the air from the air duct 106 can be tapped for inflation of the inflatable pod 108, or the air duct assembly line 122 (e.g., pneumatic line) can be installed that have an open duct beneath every seat with enough pressure to inflate the inflatable pod 108. When connected to the air duct assembly line 122, automatic inflation of the inflatable pod 108 is possible, such as, being triggered by push of a button available to all crew, pilots and passenger. Within examples, the control system triggers inflation of the inflatable pod 180, upon receipt of the electronic inflation signal, above a tray table proximate a seat in the aircraft 100.

Figure 20:
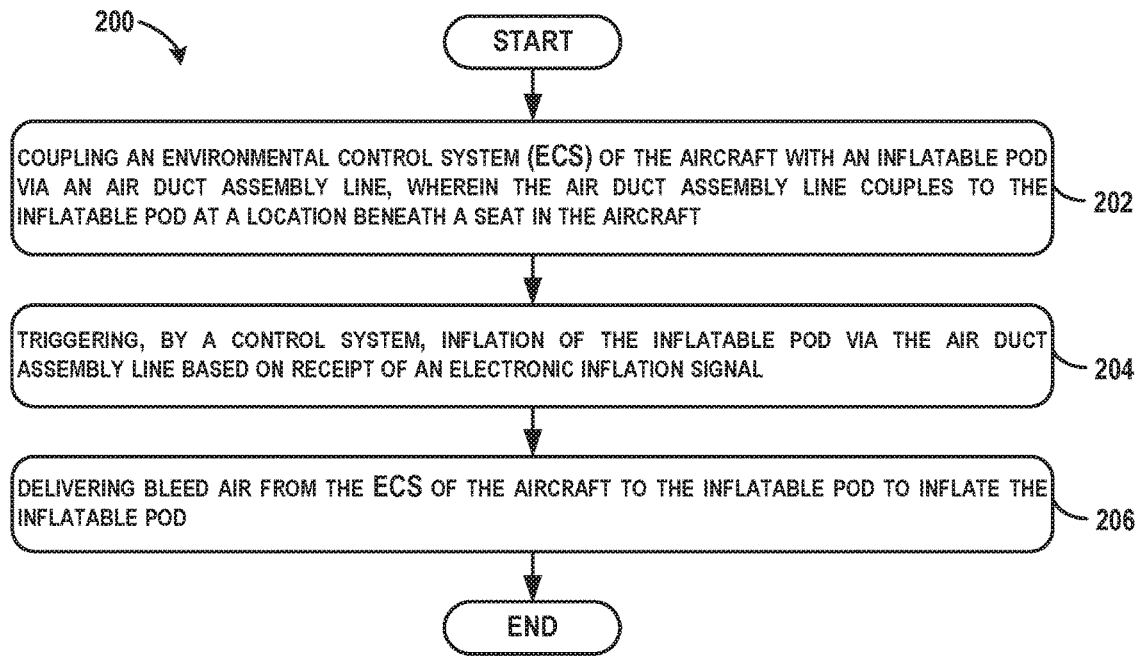
FIG. 20 shows a flowchart of an example method for inflating the inflatable pod system on the aircraft, according to an example implementation.

FIG. 20 shows a flowchart of an example of a method 200 for inflating the inflatable pod system 102 on the aircraft 100, according to an example implementation. Method 200 shown in FIG. 20 presents an example of a method that could be used with the aircraft 100 or inflatable pod system 102 shown in FIG. 1. Further, devices or systems may be used or configured to perform logical functions presented in FIG. 20. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, some or each block or portions of some or each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 20, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes coupling the ECS 104 of the aircraft 100 with the inflatable pod 108 via the air duct assembly line 122, and the air duct assembly line 122 couples to the inflatable pod 108 at a location beneath the seat 136 in the aircraft 100. At block 204, the method 200 includes triggering, by the control system 124, inflation of the inflatable pod 108 via the air duct assembly line 122 based on receipt of an electronic inflation signal. At block 206, the method 200 includes delivering bleed air from the ECS 104 of the aircraft 100 to the inflatable pod 108 to inflate the inflatable pod 108.

Figure 21:
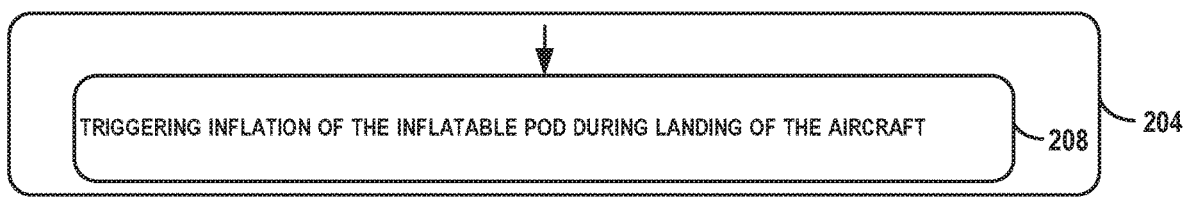
FIG. 21 shows a flowchart of an example method for triggering inflation of the inflatable pod as shown in FIG. 20, according to an example implementation.

FIG. 21 shows a flowchart of an example method for triggering inflation of the inflatable pod 108 as shown in block 204 of FIG. 20, according to an example implementation. At block 208, functions include triggering inflation of the inflatable pod 108 during landing of the aircraft 100.

Examples described herein further provide technological improvements that are particular to solving issues of comfort and safety to passengers of vehicles, namely, aircraft. The inflatable pod system 102 provides enhanced passenger experience due to sleeping comfort, reduction in passenger fatigue due to improved ergonomic sleeping position for seating, and increased safety.

For increased safety, the inflatable pod 108 can be triggered for inflation in emergency situations for use as an airbag so as to prevent passengers from striking any other interior objects in the aircraft 100, such as the seat in front each passenger, the tray tables, a window, or any others. In further examples, the inflatable pod 108 can be used as a life jacket or floating device when inflated.

The inflatable pod 108 is easy to use, and provides minimal weight additions to the aircraft 100. The inflatable pod system 102 further can be fitted with existing seats in aircraft for easy retrofitting.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An inflatable pod system on an aircraft, comprising:
    an inflatable pod including a nozzle to receive air for inflation of the inflatable pod, and including a release valve to release air and deflate the inflatable pod; and
    a hose assembly including a first end having an adaptor fitting that is configured to press fit with an air duct nozzle of an air duct of the aircraft and a second end having an adaptor configured to couple to the nozzle of the inflatable pod,
    wherein when the hose assembly is coupled between the air duct nozzle of the air duct of the aircraft and the nozzle of the inflatable pod, the hose assembly delivers bleed air from the air duct of the aircraft, as provided by an environmental control system (ECS) of the aircraft, to the inflatable pod to inflate the inflatable pod.

2. The inflatable pod system of claim 1, wherein the air duct of the aircraft is an overhead air duct positioned above a seat in the aircraft.

3. The inflatable pod system of claim 1, wherein the inflatable pod is positioned substantially beneath a seat in the aircraft when deflated.

4. The inflatable pod system of claim 1, further comprising:
    one or more straps to couple the inflatable pod to an arm rest of a seat of the aircraft.

5. The inflatable pod system of claim 1, further comprising:
    an air duct assembly line coupling the ECS of the aircraft with the inflatable pod.

6. The inflatable pod system of claim 5, wherein the inflatable pod comprises:
    a first portion coupled to the air duct assembly line;
    a second portion coupled to the first portion, wherein when inflated the second portion includes an upright cylindrical portion that is positioned in front of a seat in the aircraft; and
    a third portion coupled to the second portion, wherein when inflated the third portion includes a circular top.

7. The inflatable pod system of claim 5, wherein the inflatable pod is positioned substantially beneath a seat in the aircraft when deflated, and wherein the air duct assembly line couples to the inflatable pod at a location beneath the seat.

8. The inflatable pod system of claim 5, further comprising:
- a control system configured to trigger inflation of the inflatable pod via the air duct assembly line based on receipt of an electronic inflation signal.

9. The inflatable pod system of claim 8, wherein the control system triggers inflation of the inflatable pod during landing of the aircraft.

10. The inflatable pod system of claim 8, wherein the control system triggers inflation of the inflatable pod above a tray table proximate a seat in the aircraft.

11. The inflatable pod system of claim 1, further comprising:
- a seat; and
- a tray table positioned on a backside of the seat, wherein the tray table is in a closed position when upright and in an open position when lowered to a horizontal position,
- wherein the inflatable pod is positioned on the backside of the seat, and when inflated, the inflatable pod causes the tray table to be in the closed position.

12. The inflatable pod system of claim 1, further comprising:
- a seat; and
- a tray table positioned on a backside of the seat, wherein the tray table is in a closed position when upright and in an open position when lowered to a horizontal position,
- wherein the inflatable pod is positioned on the backside of the seat, and when inflated, the inflatable pod causes the tray table to be in the open position.

13. An inflatable pod system on an aircraft, comprising:
- an inflatable pod positioned substantially beneath a seat in the aircraft when deflated;
- an air duct assembly line coupling an environmental control system (ECS) of the aircraft with the inflatable pod, wherein the air duct assembly line couples to the inflatable pod at a location beneath the seat; and
- a control system configured to trigger inflation of the inflatable pod via the air duct assembly line based on receipt of an electronic inflation signal, wherein when inflation is triggered the air duct assembly line delivers bleed air from the ECS of the aircraft to the inflatable pod to inflate the inflatable pod.

14. The inflatable pod system of claim 13, wherein the control system triggers inflation of the inflatable pod during landing of the aircraft.

15. The inflatable pod system of claim 13, further comprising:
- a seat;
- a tray table positioned on a backside of the seat, wherein the tray table is in a closed position when upright and in an open position when lowered to a horizontal position;
- wherein when inflated, the inflatable pod causes the tray table to be in the closed position.

16. The inflatable pod system of claim 13, wherein the inflatable pod comprises:
- a first portion coupled to the air duct assembly line;
- a second portion coupled to the first portion, wherein when inflated the second portion includes an upright cylindrical portion that is positioned in front of the seat in the aircraft; and
- a third portion coupled to the second portion, wherein when inflated the third portion includes a circular top.

17. The inflatable pod system of claim 13, wherein the inflatable pod comprises:
- one or more straps to couple the inflatable pod to an arm rest of a seat of the aircraft.

18. A method for inflating an inflatable pod system on an aircraft, comprising:
- coupling an environmental control system (ECS) of the aircraft with an inflatable pod via an air duct assembly line, wherein the air duct assembly line couples to the inflatable pod at a location beneath a seat in the aircraft;
- triggering, by a control system, inflation of the inflatable pod via the air duct assembly line based on receipt of an electronic inflation signal; and
- delivering bleed air from the ECS of the aircraft to the inflatable pod to inflate the inflatable pod.

19. The method of claim 18, wherein triggering, by the control system, inflation of the inflatable pod comprises the control system triggering inflation of the inflatable pod during landing of the aircraft.

20. The inflatable pod system of claim 13, wherein the inflatable pod further includes a release valve to release air and deflate the inflatable pod.

* * * * *